(12) United States Patent
Raines et al.

(10) Patent No.: US 8,255,244 B2
(45) Date of Patent: Aug. 28, 2012

(54) SYSTEM AND METHOD FOR INSURANCE UNDERWRITING AND RATING

(75) Inventors: Richard Raines, Arlington, VA (US); Eric Nesson, Falls Church, VA (US); David Lackey, Centreville, VA (US); Travis Fritts, Columbia, MO (US); Ian Bush, Round Hill, VA (US)

(73) Assignee: Carfax, Inc., Centerville, VA (US)

( * ) Notice: Subject to any disclaimer, the term of this patent is extended or adjusted under 35 U.S.C. 154(b) by 0 days.

(21) Appl. No.: 13/181,739

(22) Filed: Jul. 13, 2011

(65) Prior Publication Data
US 2011/0270636 A1  Nov. 3, 2011

Related U.S. Application Data

(62) Division of application No. 12/105,996, filed on Apr. 18, 2008.

(60) Provisional application No. 60/907,899, filed on Apr. 20, 2007.

(51) Int. Cl.
*G06Q 40/00* (2012.01)
(52) U.S. Cl. ............................................. 705/4
(58) Field of Classification Search .............. 705/35–42, 705/1.1, 4
See application file for complete search history.

(56) References Cited

U.S. PATENT DOCUMENTS

| | | | |
|---|---|---|---|
| 6,553,354 B1 * | 4/2003 | Hausner et al. | 706/1 |
| 7,113,852 B2 | 9/2006 | Kapadia et al. | |
| 7,113,853 B2 | 9/2006 | Hecklinger | |
| 7,542,915 B2 * | 6/2009 | Kendrick | 705/4 |
| 7,827,045 B2 | 11/2010 | Madil, Jr. et al. | |
| 7,865,378 B2 * | 1/2011 | Gay | 705/4 |
| 7,890,355 B2 * | 2/2011 | Gay et al. | 705/4 |
| 7,987,103 B2 * | 7/2011 | Gay et al. | 705/4 |
| 7,991,629 B2 * | 8/2011 | Gay et al. | 705/4 |
| 2002/0091550 A1 * | 7/2002 | White et al. | 705/4 |
| 2002/0128882 A1 * | 9/2002 | Nakagawa et al. | 705/4 |
| 2003/0158758 A1 * | 8/2003 | Kanazawa et al. | 705/4 |
| 2005/0273368 A1 * | 12/2005 | Hutten et al. | 705/4 |
| 2006/0095301 A1 * | 5/2006 | Gay | 705/4 |
| 2006/0095302 A1 * | 5/2006 | Vahidi et al. | 705/4 |
| 2007/0033076 A1 * | 2/2007 | Sadeghi | 705/4 |
| 2007/0061173 A1 * | 3/2007 | Gay | 705/4 |
| 2007/0106539 A1 * | 5/2007 | Gay | 705/4 |
| 2007/0156468 A1 * | 7/2007 | Gay et al. | 705/4 |
| 2007/0288270 A1 * | 12/2007 | Gay et al. | 705/4 |

(Continued)

OTHER PUBLICATIONS

Nauman, Matt, "Used-Car Fact (or Fiction) Checker See a Car's History Online", San Jose Mercury News (SJ) Friday, Jun. 20, 2003, pp. 1-3.*

(Continued)

*Primary Examiner* — Ella Colbert
*Assistant Examiner* — Mohammad Z Shaikh
(74) *Attorney, Agent, or Firm* — Baker & Hostetler LLP

(57) ABSTRACT

An apparatus and method for underwriting and/or rating an insurance policy, and for generating information for underwriting and/or rating an insurance policy, are provided. The system and method may include identifying a vehicle, determining a value of at least one vehicle history data variable or a group of variables, and underwriting and/or rating the policy based on the value of the at least one vehicle history data variable or a group of variables. The system and method may also include generating a score based on the value of the at least one vehicle history data variable or group of variables.

27 Claims, 10 Drawing Sheets

U.S. PATENT DOCUMENTS

2007/0299700 A1* 12/2007 Gay et al. .................. 705/4
2008/0046383 A1* 2/2008 Hirtenstein et al. .......... 705/400

OTHER PUBLICATIONS

"AutoCheck(R) to be Exclusive History Provider for Autobytel Web sites.", PR Newswire, Feb. 11, 2006, pp. 1-2.*

Lade, Diance C, Carfax Sometimes Lacks Key Facts Suit May Help Buyers Who Relied on Vehicle History Reports; [Broward Metro Edition], South Florida Sun-Sentinel, Fort Lauderdale, Fla: Feb. 12, 2007, p. A.1.*

"Carmax Introduces Free Online Vehicle History Experian's AutoCheck (R) Vehicle History Report Now Available on all CarMax Vehicles", PR Newswire, Monday, Apr. 24, 2006, pp. 1-2.*

Business/Technology Editors, "ebix.com, Inc. and ChoicePoint Partner to Deliver Underwriting Products on ebix.com", Business Wire. New York: Oct. 19, 1999. p. 1.*

"Experian Automotive and the First American Corporation Launch AutoCheck w/TitleGuard; Most Comprehensive Vehicle History and Title Insurance Offered Direct to Consumers.", PR Newswire, Mar. 26, 2003, pp. 1-3.*

"Vehicle History Reports Easier to Understand with Introduction of the AutoCheck Score (SM); Experian Automotive's numerical scoring system for used cars makes understanding and comparing vehicle histories simpler", PR Newswire. New York: Feb. 3, 2007, pp. 1-2.*

Weisberg, et al., "Quantitative Methods for Detecting Fraudulent Automobile Bodily Injury Claims," Mar. 26, 1998.

* cited by examiner

| DEMOGRAPHIC FILE | | |
|---|---|---|
| CATEGORY | VEHICLE IDENTIFICATION DATA | DESCRIPTION |
| VEHICLE DESCRIPTION | VIN | VEHICLE IDENTIFICATION NUMBER |
| | YEAR | MODEL YEAR OF THE VEHICLE |
| | MAKE | VEHICLE MANUFACTURER |
| | MODEL | VEHICLE MODEL |
| OWNERSHIP INFO | LAST OWNER ACQUISITION DATE | DATE OF MOST RECENT TITLE CHANGE |
| | LAST OWNER TITLING STATE | STATE ISSUING THE MOST RECENT TITLE |
| | LAST OWNER CITY | MOST RECENT OWNER'S CONTACT CITY |
| | LAST OWNER STATE | MOST RECENT OWNER'S CONTACT STATE |
| | LAST OWNER ZIP | MOST RECENT OWNER'S CONTACT ZIP CODE |
| | LAST ODOMETER READING | MOST RECENT ODOMETER READING |

*FIG. 3*

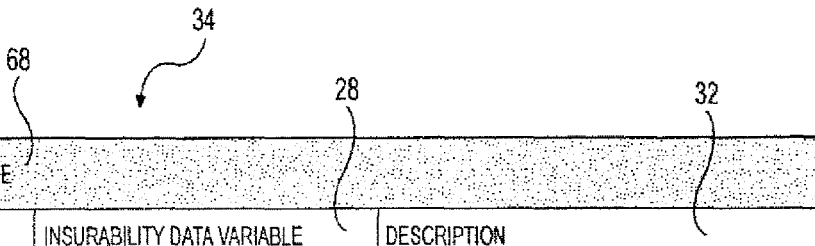

| SEVERE PROBLEM FILE | | |
|---|---|---|
| CATEGORY | INSURABILITY DATA VARIABLE | DESCRIPTION |
| SEVERE PROBLEM INDICATOR | SEVERE PROBLEM FLAG | ANY TYPE OF TITLE BRAND, SEVERE ACCIDENT INDICATOR, OR STOLEN VEHICLE INDICATOR LISTED BELOW |
| TITLE BRANDS | TITLE BRAND FLAG | ANY TYPE OF TITLE BRAND LISTED BELOW |
| | SALVAGE | SALVAGE TITLE BRAND |
| | JUNK | JUNK TITLE BRAND |
| | REBUILT/ RECONSTRUCTED | REBUILT/ RECONSTRUCTED TITLE BRAND |
| | DISMANTLED | DISMANTLED TITLE BRAND |
| | FLOOD | FLOOD TITLE BRAND |
| | FIRE | FIRE TITLE BRAND |
| | HAIL | HAIL TITLE BRAND |
| | CANADIAN TOTAL LOSS | CANADIAN TOTAL LOSS TITLE BRAND |
| | MANUFACTURER BUYBACK (LEMON) | MANUFACTURER BUYBACK TITLE BRAND |
| | NOT ACTUAL MILEAGE | NOT ACTUAL MILEAGE TITLE BRAND |
| | EXCEEDS MECHANICAL LIMITS | EXCEEDS MECHANICAL LIMITS TITLE BRAND |
| SEVERE ACCIDENT INDICATORS | SEVERE ACCIDENT FLAG | ANY TYPE OF SEVERE ACCIDENT INDICATOR LISTED BELOW |
| | INSURANCE TOTAL LOSS | INSURANCE COMPANY TOOK OWNERSHIP DUE TO A TOTAL LOSS PAYOUT |
| | POLICE ACCIDENT REPORT- SEVERE DAMAGE | POLICE ACCIDENT REPORT INDICATES "SEVERE" DAMAGE |
| | CRASH TEST VEHICLE | USED AS A CRASH TEST VEHICLE |
| | SALVAGE AUCTION | SOLD AT SALVAGE AUCTION |
| | RECYCLE VEHICLE | LISTED IN RECYCLER INVENTORY, RECYCLED FOR PARTS, COMPONENTS REMOVED, OR SCRAPPED AT A RECYCLER |
| | DAMAGE DISCLOSURE | DAMAGE TO VEHICLE REPORTED BY OWNER |
| | AIRBAG DEPLOYMENT | AIRBAG DEPLOYED |
| | FIRE DAMAGE | VEHICLE DAMAGED IN A FIRE |
| STOLEN VEHICLE | STOLEN VEHICLE FLAG | ANY TYPE OF STOLEN VEHICLE INDICATOR LISTED BELOW |
| | REPORTED AS STOLEN | REPORTED AS STOLEN |
| | THEFT RECOVERY | REPORTED AS A THEFT RECOVERY |

*FIG. 4*

| OWNERSHIP TYPE FILE | | |
|---|---|---|
| CATEGORY | INSURABILITY DATA VARIABLE | DESCRIPTION |
| OWNERSHIP TYPE | PERSONAL | REGISTERED BY A PERSONAL OR PRIVATE INDIVIDUAL OWNER |
| | COMMERCIAL | REGISTERED AS A COMMERCIAL VEHICLE |
| | CORPORATE FLEET | REGISTERED AS PART OF A CORPORATE FLEET |
| | TAXI | REGISTERED AS A TAXI |
| | RENTAL | REGISTERED AS A RENTAL VEHICLE |
| | LEASE | REGISTERED AS A LEASE VEHICLE |
| | POLICE | REGISTERED AS A VEHICLE USED IN LAW ENFORCEMENT |

*FIG. 7*

| POTENTIAL FRAUD FILE 78 | | |
|---|---|---|
| CATEGORY | INSURABILITY DATA VARIABLE 28 | DESCRIPTION 32 |
| IMPORT/EXPORT INDICATORS | GRAY MARKET VEHICLE | VEHICLE WAS MANUFACTURED TO THE STANDARDS OF A COUNTRY OTHER THAN THE U.S. |
| | EXPORTED VEHICLE | LISTED AS AN EXPORT AFTER THE FIRST OWNER, OR REGISTERED OUTSIDE THE U.S. |
| | IMPORTED VEHICLE | LISTED AS AN IMPORT AFTER THE FIRST OWNER |
| CARFAX ALERTS | VIN CLONING ADVISORY | CONTAINS A PATTERN OF EVENTS THAT MAY INDICATE VIN CLONING |
| | CURBSTONING ADVISORY | CONTAINS A PATTERN OF EVENTS THAT SUGGEST THE VEHICLE WAS PURCHASED FROM AN UNLICENSED DEALER |
| | DUPLICATE TITLE ISSUED | A DUPLICATE TITLE DOCUMENT WAS ISSUED ON THE VEHICLE |

*FIG. 9* ically, there
SYSTEM AND METHOD FOR INSURANCE UNDERWRITING AND RATING

CROSS REFERENCE TO RELATED DOCUMENTS

This application is a divisional of U.S. patent application Ser. No. 12/105,996, entitled "System and Method for Insurance Underwriting and Rating", filed Apr. 18, 2008, which claims priority to U.S. Provisional Patent Application No. 60/907,899 entitled "System and Method for Insurance Underwriting and Rating," filed Apr. 20, 2007, the entire disclosure of each of the preceding applications being hereby incorporated by reference herein in their entirety.

BACKGROUND OF THE INVENTION

1. Field of the Invention

The present invention is directed to a system and method of insurance underwriting and rating vehicles. In particular, the present invention is directed to such system and method in which insurance underwriting and rating are provided based on vehicle history attributes.

2. Description of Related Art

The vehicle industry is perhaps one of the largest industries in many industrialized regions of the world. As a result, the market for used vehicles, and especially automobiles, has evolved into a substantial market, especially in North America, and in particular, the United States and Canada.

Those parties involved in insuring used vehicles recognize the value of information relating to a few specific facts related to a vehicle in making a decision to write a new policy and determining the price of that policy. Consequently, services have been created that function primarily to provide certain limited vehicle history information to various parties in the used vehicle market, including, for example, insurance providers.

When an insurance company is writing a new policy, they first "underwrite" that policy to determine whether the risk is one they are willing to accept or not, and if so, to which class of policies it belongs. Many insurers have both "standard" and "nonstandard" policy classes with the less risky policies going into the standard class and the riskier policies (e.g., teenage drivers) going into the nonstandard class. That being said, some insurers have only one policy class and some have multiple policy classes depending on how they have elected to structure their underwriting criteria.

Once the insured is assigned to a class through underwriting, the insurance company then "rate" that policy based upon a set of criteria to determine a specific premium to be charged. Traditionally, this criteria has revolved around the class of vehicle (e.g., sports car vs. family sedan; 8 cylinder vs. 4 cylinder), driver behavior (e.g., number of speeding tickets, the expected annual miles to be driven), and driver characteristics (e.g., age, gender).

Most insurers will not underwrite a vehicle that has previously received certain title brands due to concerns about its structural integrity. For example, if the vehicle has been in a flood, then its wiring may be more likely to malfunction potentially leading to an accident. Likewise, if the vehicle has previously sustained major damage and is in a subsequent accident, insurers may believe that the new damage is likely to be amplified due to a weakened structure or the previous use of aftermarket parts.

Therefore, many insurers may require the insured to inform them if the title of the vehicle has been branded. If an insured fails to make this disclosure and the insurance company discovers this failure during the evaluation of a claim, the insurance company may elect to modify its claim payments or deny the claim in its entirety. Thus, the issue of branded title vehicles has historically been handled on the back end of the insurance process.

Some insurers have experienced enough of a problem with unwittingly insuring branded title vehicles that they have instituted a process for checking the vehicle's title prior to issuing a policy. For example, an insurance provider may run a CARFAX Vehicle History Report on every vehicle as a part of their underwriting process. If the vehicle is determined to have a particular title brand, the insurance provider may decline to insure the vehicle.

Many insurance providers utilize the title brand data for underwriting only. This data is generally accessed through association with the particular Vehicle Identification Number (VIN). For example, an insurance company may decide not to insure a vehicle having a salvage or flood title brand. Also, some insurers use the expected annual miles to be driven in the future as one of the criteria for determining a premium for an insurance policy. In fact, California law now requires insurance companies operating in California to use the aforementioned annual mileage as one of the rating factors used to determine policy premiums.

However, relying solely on prospective annual mileage information may not be desirable, because historhas been no reliable source for providing this data. Many insurers using this data rely on the insured to self report their expected annual miles to be driven or rely on a crude statistical estimation model based upon the distance driven between home and work. There are also other statistical models employed, such as random sampling and "area rating", where it is assumed that everyone in the same geographic area drives the same amount yearly unless otherwise noted.

Therefore, there exists an unfulfilled need for a system and method for underwriting insurance policies and providing a system and method for rating underwritten insurance policies. In addition, there also exists an unfulfilled need for such a system and method in which underwriting is provided based on vehicle history events related to a specific vehicle. Furthermore, there also exists an unfulfilled need for a system and method for underwriting insurance policies and providing a system and method for rating underwritten insurance policies from information related specifically to a particular vehicle based on of that specific vehicle's history.

SUMMARY OF THE INVENTION

In accordance with an embodiment of the present invention, a method of underwriting an insurance policy includes identifying a vehicle, forming at least one data grouping including at least one vehicle history data variable of the identified vehicle, and processing the at least one vehicle history data variable of the at least one data grouping. The method may also include determining an overall value of the at least one data grouping and underwriting an insurance policy for the identified vehicle based on said overall value of the at least one data grouping.

In accordance with another embodiment of the present invention, a method of rating an insurance policy includes identifying a vehicle, forming at least one data grouping including of least one vehicle history data variable of the identified vehicle, and processing the at least one vehicle history data variable of the at least one data grouping. The method may further include determining an overall value of the at least one data grouping and rating an insurance policy for the identified vehicle based on the overall value of the at least one data grouping.

In accordance with yet another embodiment of the present invention, a method of determining insurability of a vehicle includes identifying a vehicle, forming at least one data grouping including at least one vehicle history data variable of the identified vehicle, and processing the at least one vehicle history data variable of the at least one data grouping. The method may also include determining an overall value of the at least one data grouping and calculating insurability of the identified vehicle based on the overall value of the at least one data grouping.

In yet another embodiment of the present invention, an apparatus for underwriting an insurance policy includes a means for identifying a vehicle, a means for forming at least one data grouping including at least one vehicle history data variable of the identified vehicle, and a means for processing the at least one vehicle history data variable of the at least one data grouping. The apparatus may further include a means for determining an overall value of the at least one data grouping and a means for underwriting an insurance policy for the identified vehicle based on the overall value of the at least one data grouping.

In still another embodiment of the present invention, an apparatus for rating an insurance policy includes a means for identifying a vehicle, a means for forming at least one data grouping including of least one vehicle history data variable of the identified vehicle, and a means for processing the at least one vehicle history data variable of the at least one data grouping. The apparatus may further include a means for determining an overall value of the at least one data grouping and a means for rating an insurance policy for the identified vehicle based on said overall value of the at least one data grouping.

In yet another embodiment of the present invention, an apparatus for determining insurability of a vehicle includes a means for identifying a vehicle, a means for forming at least one data grouping including at least one vehicle history data variable of the identified vehicle, and a means for processing the at least one vehicle history data variable of the at least one data grouping. The apparatus may also include a means for determining an overall value of the at least one data grouping and a means for calculating insurability of the identified vehicle based on said overall value of the at least one data grouping.

BRIEF DESCRIPTION OF THE DRAWINGS

FIG. 3 provides a diagrammatic view of accumulated data for identifying a vehicle according to one disclosed embodiment.

FIGS. 4-9 provide diagrammatic views of various data groupings according to exemplary disclosed embodiments.

DETAILED DESCRIPTION OF THE PREFERRED EMBODIMENT

Figure 1:
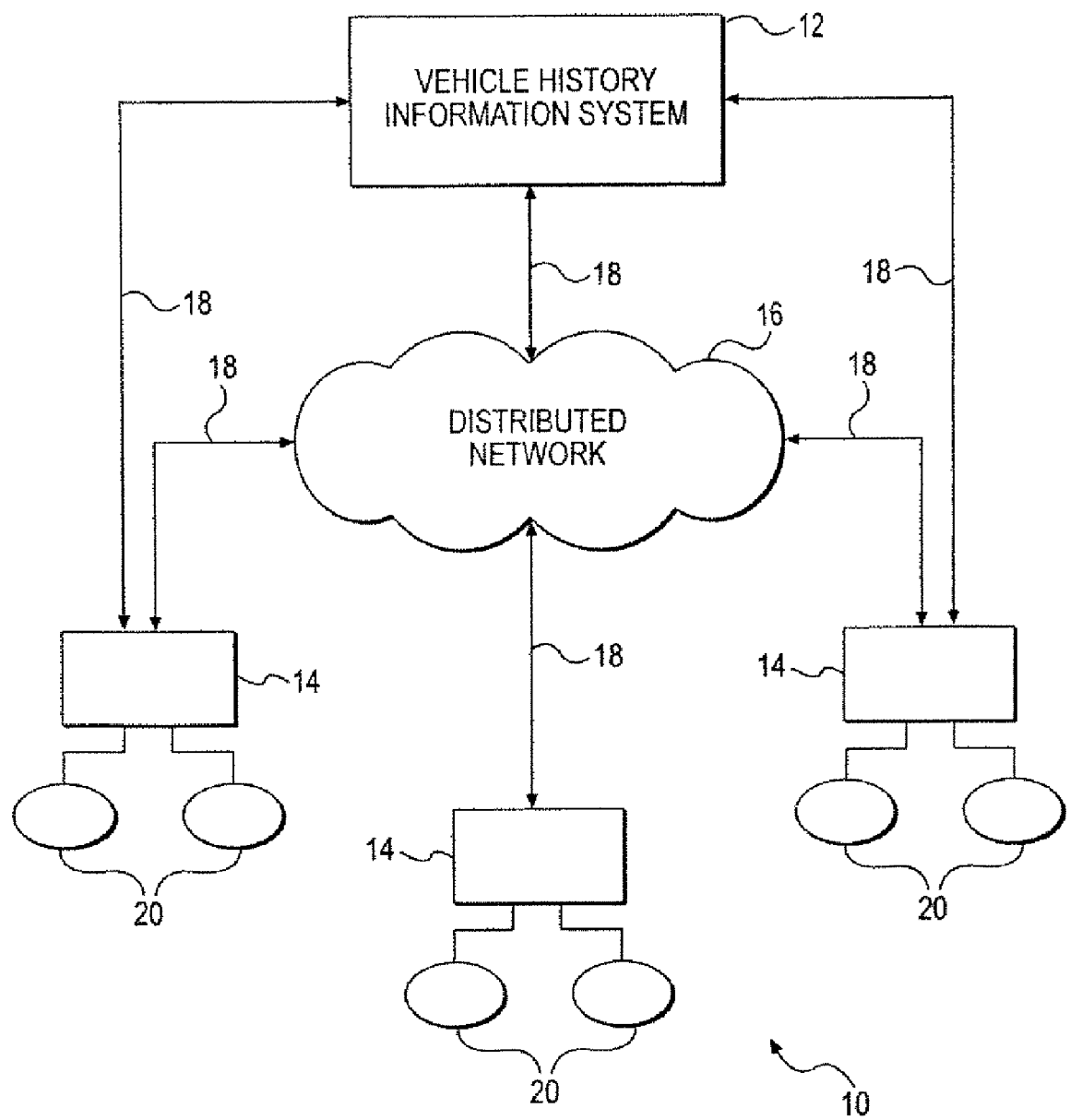
FIG. 1 is a general schematic illustration of a vehicle history information system in accordance with one embodiment of the present invention.

FIG. 1 is a schematic diagram of a system in accordance with one example embodiment of the present invention which can be used to underwrite an insurance policy and, where a decision is made to write a policy, to provide a rating of the insurance policy. Initially, it should be understood that the term "insurability" may be used to describe the capability to underwrite an insurance policy and, in cases where a decision is made to write a policy, to rate the insurance policy based upon information provided by embodiments of the present invention. Also, the term "underwriting" encompasses both the act of deciding whether or not to offer a policy to an applicant/vehicle as well as the act of assigning an applicant/vehicle to a particular policy class based upon the risk posed by the applicant/vehicle. Thus when underwriting a policy for an applicant, the insurance company may elect to assign the applicant/vehicle to a preferred policy class, assign the applicant/vehicle to an at risk policy class, or decline to write a policy for the applicant/vehicle altogether. The term "rating" encompasses determining an applicant's policy premium within their assigned class based upon specific variables pertaining to the applicant/vehicle.

It is further understood that the term "vehicle" is used broadly herein to encompass a variety of transportation devices. For example, vehicles include automobiles of all types, motorized cycles including motorcycles and all terrain vehicles, boats, watercraft, airplanes, etc. In this regard, the present invention may be implemented in the manner described to determine insurability for such vehicles. Thus, although the example embodiment discussed in detail below focuses on automobiles, it should be understood that the present invention is not limited thereto but may be implemented to determine insurability for any vehicle. Also, an insurance policy may include one or any number of vehicles and the method of the present invention may result in dividing the policy into multiple policies to permit a policy to be written on one or more applicants/vehicles and not on others, for assigning the vehicles to different policy classes based on risk, and/or rating the policies different based on risk. Moreover, the present invention may be implemented to determine the insurability of any other insurance policies, such as home, life, or other insurable asset, based on the vehicle history data variables, and/or groups thereof, as discussed more fully hereinbelow.

FIG. 1 is a schematic diagram of a system, for example in the form of a networked computer system 10, designed to implement one embodiment of the subject invention. FIG. 1 may also be viewed as showing the relationship of the different entities potentially involved in the application of the present invention. Specifically, a computer implemented vehicle history information system 12 exchanges data with one or more remote terminals 14 through data transmission across a distributed network 16, e.g. Internet. Alternatively, the one or more remote terminals 14 may communicate directly with the vehicle history information system 12. The terminals 14 are associated with an entity (e.g., an insurance company) accessing vehicle history information system 12, as discussed more fully herein below, to obtain vehicle history information for underwriting and rating insurance policies.

The vehicle history information system 12 may be linked to one or more vehicle history data sources or suppliers that allow the vehicle history information system administrator to receive and update vehicle history information in system 12. The vehicle history data supplier may be individual consumers, vehicle dealers, state titling offices, Department of Motor Vehicles, auto auctions and/or any other source of vehicle information.

The terminals 14 may be in communication with the vehicle history information system 12 via distributed network 16. The distributed network 16 may be any type of communications channel such as a local area network (LAN), wide area network (WAN), and/or direct computer connections, and (or be implemented using) wireless connections, radio frequency, infrared, or other wireless technologies using any appropriate communication hardware and protocols, and may further be the Internet. Thus, terminals 14 may be connected to distributed network 16 by any communication links 18, including hardwired and/or wireless links.

Figure 2:
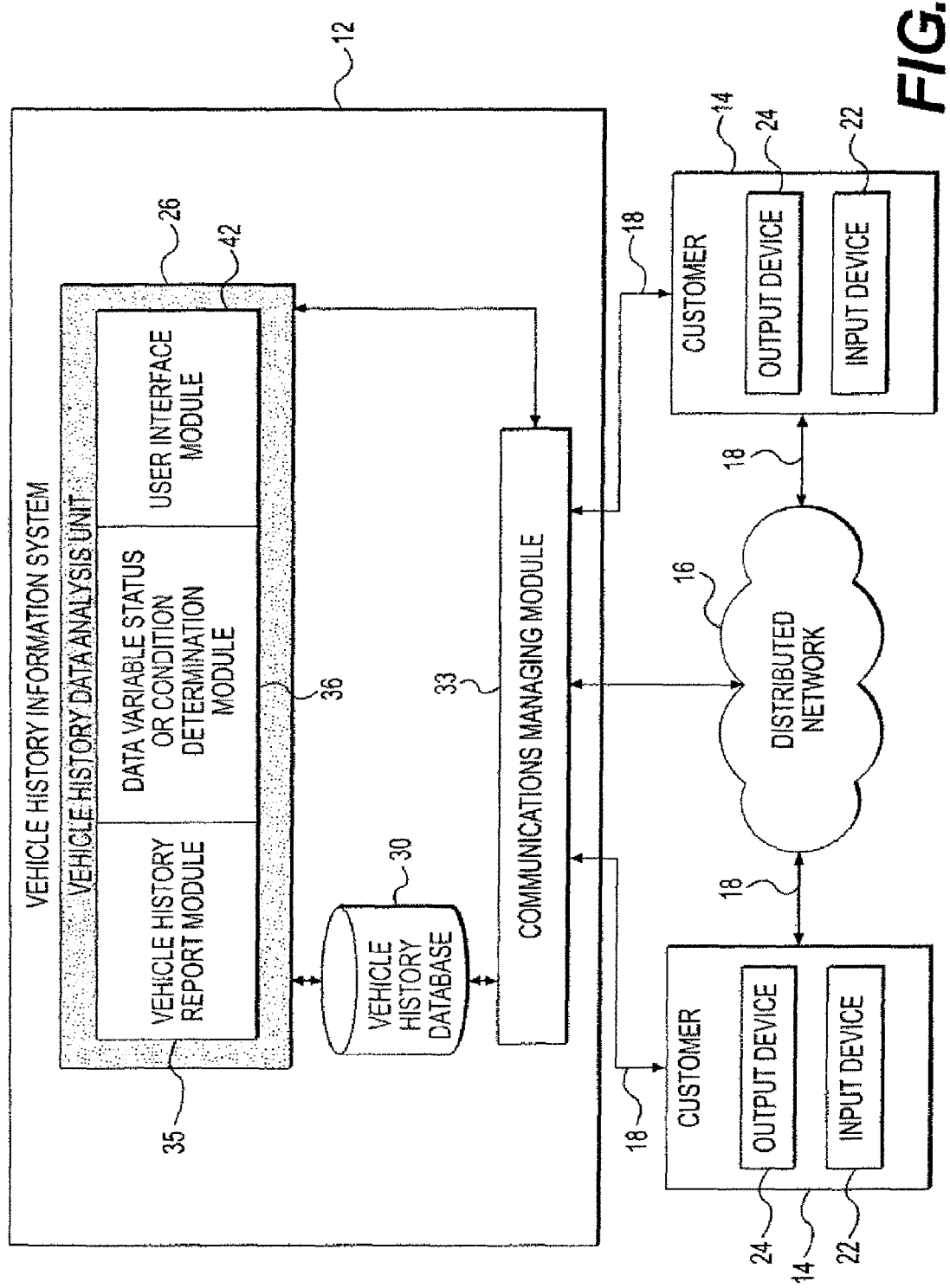
FIG. 2 is a detailed schematic illustration of the vehicle history information system in accordance with one implementation of the present invention.
Figure 5:
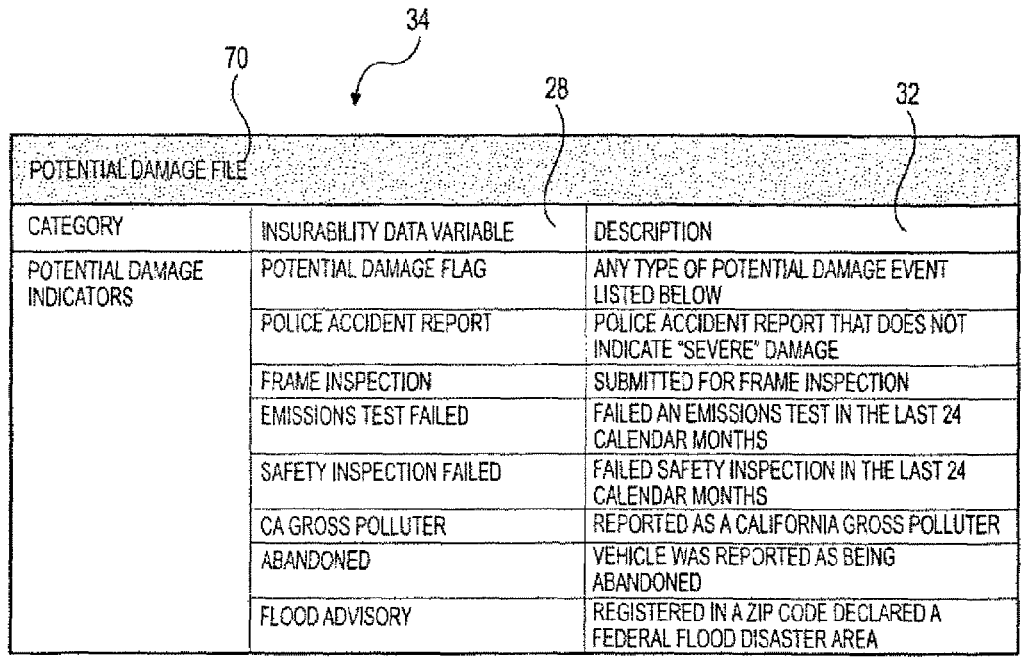
Figure 6:
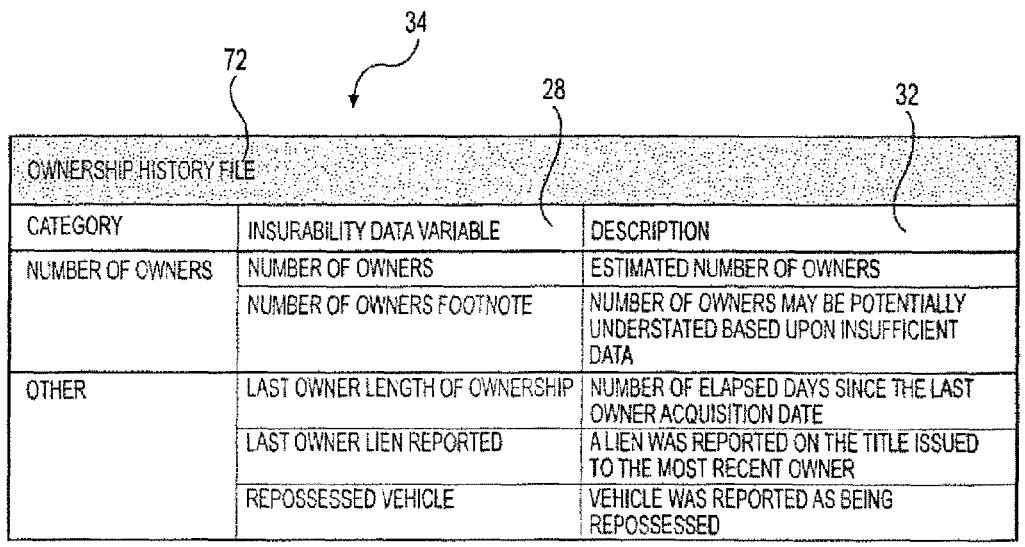
Figure 8:
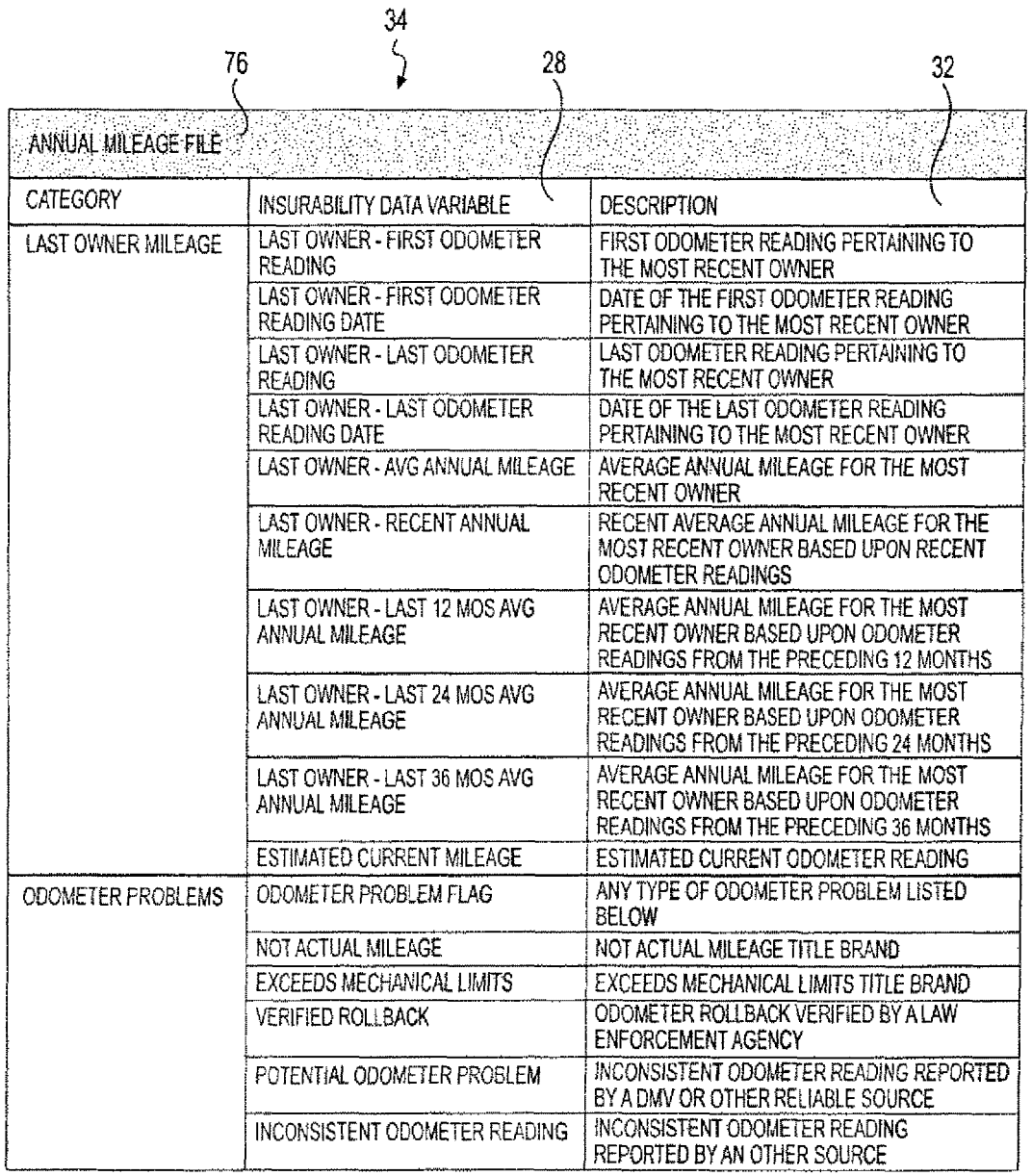

FIG. 2 illustrates in more detail the vehicle history information system 12 in accordance with one example embodiment of the present invention. Generally, vehicle history information system 12 may be implemented with any type of appropriate hardware and software, and can be embodied as computer readable storage media having executable instructions, and/or a computer architecture as discussed herein below. Vehicle history information system 12 may be implemented using a server, personal computer, a portable computer, a thin client, or any other computing drive, such as a handset, or any combination of such devices. In this regard, vehicle history information system 12 may be a single device at a single location as shown, or multiple devices at a single location, or multiple locations that are connected together using any appropriate communication protocols over any communication medium.

FIG. 2 also illustrates in more detail the preferred implementation of the terminals 14. Although only two terminals are shown in detail as the customer terminals which represent the entities (e.g., insurance companies) of FIG. 1, it should be appreciated that any number of terminals 14 may be implemented in communication with the distributed network 16. Terminal 14 may be any appropriate device for accessing vehicle history information system 12 such as a personal computer, portable computer, thin client, a handheld device such as a mobile phone handset or PDA, and the like. Terminal 14 includes an input device 22 and an output device 24 which allow the user of the terminal 14 to provide information to, and receive information from, the vehicle history information system 12 via the distributed network 16. The input device 22 may include a keyboard, mouse, etc. as well as memory devices based on magnetic, optical and/or solid state technologies including disc drives, CD/DVD drives, flash memory, etc. The output device 24 may include a monitor screen, printer, etc. that allow the user of the terminal 14 to obtain the vehicle history attribute information from vehicle history information system 12. The terminal 14 or customer location may also include an underwriting and rating module 25 adapted to process information received from the vehicle history information system 12 and generate information for making a decision regarding underwriting and/or rating, or process the received information to generate a decision regarding underwriting and/or rating, discussed more fully hereinbelow. The output of the underwriting and rating module 25 and/or the information received from the vehicle history information system 12 may be displayed by the output device 24.

Referring again to FIG. 2, in the preferred embodiment, vehicle history information system 12 includes a vehicle history data analysis unit 26, a vehicle history database 30, and a communications managing module 33, all of which are connected together for effective data communication. Vehicle history data analysis unit 26, in the implementation shown, includes a vehicle history report module 35, a data determination module 36, and a user interface module 42, the functions of each being further described herein below.

Vehicle history database 30 contains a plurality of vehicle history datasets which are collections of vehicle history data arranged, organized, indexed and/or retrievable based on a unique indicator such as the unique vehicle identification number (such as VIN for automobiles) of a particular vehicle. Each vehicle sold within the United States and most foreign countries has a unique identification number which is identified on nearly every vehicle title issued and physically identified on the respective vehicle. The identification can be used to identify and trace the public record of each particular vehicle and to associate different vehicle data collected from a variety of sources with the particular vehicle.

It should be noted that the vehicle history information system 12 and the vehicle history data analysis unit 26 in accordance with the embodiment of the present invention is illustrated and discussed herein as having various modules which perform particular functions. It should be understood that these modules are merely schematically illustrated based on their function and do not necessarily represent specific hardware or software. In this regard, these modules, units and other components may be hardware and/or software implemented to substantially perform their particular functions explained herein. The various functions of the different modules and units can be combined or segregated as hardware and/or software modules in any manner, and can be used separately or in combination. Thus, the present invention as schematically embodied in FIG. 2 should not be construed to limit the vehicle history information system 12 of the present invention.

It should be clarified that as used herein, the term "vehicle" generally refers to only one particular, physical vehicle associated with a single identification number and does not refer to general model level information or categories of vehicles. Such general model level information relating to a specific make, model and/or year, is referred to as "type" of vehicle herein. Thus, the vehicle history database 30 has a plurality of vehicle history datasets related to a plurality of vehicles, each vehicle history dataset being related to a particular vehicle and having vehicle history attributes regarding the vehicle as described below.

As previously mentioned, the administrator of vehicle history information system 12 acquires vehicle history datasets from a variety of data suppliers. The vehicle history datasets from the vehicle history data supplier which are entered into vehicle history database 30 are associated with a particular identification number and thus, a particular vehicle. The vehicle data forming the vehicle history datasets are added as records to vehicle history database 30 and indexed by the identification number. Therefore, the vehicle history datasets stored in the vehicle history database 30 preferably include stored vehicle history attributes for a multitude of vehicles. The vehicle history datasets may be utilized by the vehicle history information system 12 in any appropriate manner. For example, the vehicle history datasets may be utilized by the vehicle history report module 35 to generate a report by retrieving vehicle history attributes associated with the requested identification number of a particular vehicle. Some examples of vehicle history attributes include accident information, branded title information (such as salvage title), police accident report and damage disclosure information, mileage information (such as odometer problems and actual mileage listings), title/registration events (including government registration, taxi registration and commercial registration), stolen vehicle information, fleet information, emissions and safety inspection information, recall information, number of owners, and any other information relevant to the history of the vehicle.

Vehicle history database 30 may be any appropriately implemented database capable of effectively storing vehicle history datasets in an organized accessible manner to permit efficient easy access to desired pieces of data, e.g. one or more records associated with a particular identification number, using appropriate database management system software. Preferably, vehicle history database 30 receives information from, and may be accessed by, various components of vehicle history information system 12.

Applicants have determined that a correlation exists between certain historical attributes of a vehicle and the likelihood of further damage, the severity of further damage, and/or the cost of repair to the vehicle in the future. Applicants' findings demonstrate that for certain historical events of a particular vehicle, subsequent damage is likely to occur and/or the severity of the damage and/or the cost of repair is likely to be greater. These historical attributes or events are referred to herein as insurability data variables and are unique to a particular vehicle. Thus, throughout the description of this disclosure, the insurability data variables may also be referred to as vehicle history data variables. Hence, the present invention recognizes that the prospect of future vehicle damage and potential repair expense based on specific historic events may affect the insurability of a particular vehicle. Further advantages of the present invention include determining which vehicle history attributes correlate to the prospect of further vehicle damage and associated repair costs. It is noted that the insurability data variables may include, for example, only a portion of all available vehicle history attributes in database 30.

For example, an insurance company may determine that it is not cost-effective to insure a vehicle having a certain vehicle history, because that vehicle's history suggests costly future damages in the event of a subsequent accident. Again, the vehicle history for a specific vehicle is qualified by that vehicles' unique vehicle history data variables. The insurability of the particular vehicle may be directly attributed to these aforementioned vehicle history data variables. The use of the insurability data variables, as disclosed herein, in the insurance underwriting and rating industry process can affect a used vehicle's insurability.

FIGS. 4-9 show a listing of numerous vehicle history data variables, identified as insurability data variables 28, that may be identified and stored in the vehicle history database 30 in datasets associated with a particular vehicle. For each insurability data variable 28 listed in FIGS. 4-9, a corresponding description 32 of that insurability data variable 28 is also provided. However, Applicants have also realized that distinct inferences can be made from evaluating insurability data variables 28 in a manner previously unknown in the prior art for determining insurability of vehicles. These inferences further support Applicants' findings that for certain historical events of a particular vehicle, subsequent damage is likely to occur, and/or the severity of the damage and/or the cost of repair is likely to be greater. Hence, entities, such as insurance providers, may be interested in knowing which factors of vehicle history (such as the disclosed insurability data variables 28) may affect insurability for one or more vehicles.

For example, the "Airbag Deployment" insurability data variable 28 indicates that the particular vehicle's air bag has deployed. In many instances, it could be inferred that the particular vehicle was in an accident. Increased amounts of fraud have been associated with servicing deployed airbags. In one study, statistical data shows that a driver is five percent more likely to be injured in a vehicle with a previously deployed airbag purported to be fixed. This may be due to failure to properly service a previously deployed airbag. Hence a subsequent malfunction may occur, for example, in which the allegedly repaired airbag fails to properly deploy such as in a future accident. Thus, the tendency for the driver of the vehicle to become injured increases. In another example, the airbag may prematurely deploy and cause injury to a driver. These events may ultimately affect insurance company premiums in order to compensate for appropriately filed insurance claims for such incidents. Consequently, the insurability of a vehicle that has this insurability data variable 28 may also be affected.

"Abandoned" insurability data variable 28 indicates that the particular vehicle was abandoned by an owner for some reason.

"Police Accident Report—Severe Damage" insurability data variable 28 denotes that a police accident report indicates that the particular vehicle sustained severe damage in an accident. The "Police Accident Report—Severe Damage" insurability data variable 28 is preferably distinguished from a less serious accident. For example, additional factors usually contribute to the conclusion that an accident was severe. This may be attributed to the kind and/or severity of damage that the vehicle sustains such as that incurred in a vehicle that was involved in a rollover accident.

"Police Accident Report" insurability data variable 28 indicates a police accident report that does not indicate "severe" damage. In this scenario, the vehicle may sustain considerably less damage than that of a severe accident and may also be regarded as a less serious or non-severe accident. A review of the "Police Accident Report" insurability data variable 28 may be important for flushing out insurance fraud. In one example, a vehicle may incur minor damage to an area of the vehicle which the owner declines to fix. However, the vehicle may be involved in another accident—perhaps sustaining additional damage such as in an area proximate to the damage of the first accident. This may present an opportunity for the owner to engage in fraudulent activity. For example, in deciding to file an insurance claim for the damages of the second accident, the owner may also attempt to claim the damages for the first unrelated accident. Thus, by linking the two damages, the owner may purport that the accident was more serious and caused more damaged than what really occurred. This kind of fraudulent activity has also taxed insurance providers who, in turn, assess additional premiums passed on to the customer in order to cover these additional fraudulent expenses. Additionally, some changes in procedure have been implemented by insurance providers to address this problem. This may include visually inspecting vehicles prior to issuing a new insurance policy. However, this procedure can increase operating expenses and require additional manpower for performing such tasks. It is therefore desirable to advise insurance providers about this insurability data variable 28 in a manner which would affect insurability as disclosed herein.

"Commercial" insurability data variable 28 indicates that the particular vehicle was registered for commercial use. While this type of vehicle is generally well maintained, it is also typically driven very hard or in a manner that is harder than privately owned vehicles. In short, more risks are likely taken with this kind of vehicle. Hence, the mechanical integrity of the vehicle is more likely to suffer or be compromised. Thus, future and/or more expensive repair costs are more likely to occur for a vehicle determined to be commercial. Thus, knowing this possibility and how it relates to insurability, in accordance with the disclosed invention, it is possible to advise an entity, such as an insurance provider, accordingly.

"Curbstoning Advisory" insurability data variable 28 indicates a pattern of events that suggests the vehicle was purchased from an unlicensed dealer. In one example, the particular vehicle was sold by a dealer posing as a private owner of the vehicle, such sale tactics being generally employed when there is something wrong with the vehicle and the dealer wants to deceive the buyer and not disclose the problems of the vehicle.

"Crash Test Vehicle" insurability data variable 28 indicates that the particular vehicle was used in vehicle crash testing.

"Damage Disclosure" insurability data variable 28 indicates that damage to the particular vehicle was reported, for example, by the owner.

"Dismantled" insurability data variable 28 indicates that the particular vehicle contains a dismantled title brand. This indicates that the particular vehicle was dismantled for parts or recycling, for example, by a salvage yard.

"Emissions Test Failed" insurability data variable 28 indicates that the particular vehicle failed emissions testing in the last twenty-four calendar months. This insurability data variable 28 may indicate that the vehicle was not properly maintained or address a degree of how well the maintenance of the vehicle was kept. This could also be indicative of driver behavior including, for example, that the driver tends to be irresponsible or tends not to be a good driver. Such inferences could also affect insurability of a vehicle.

"Fire Damage" insurability data variable 28 indicates that the particular vehicle was damaged in a fire.

"Corporate Fleet" insurability data variable 28 indicates that the particular vehicle was registered as part of a commercial fleet, for example, as a company vehicle. The inferences/conclusions made for this insurability data variable 28 are generally the same as those listed under "Commercial" insurability data variable 28.

"Flood" insurability data variable 28 indicates that the particular vehicle has incurred damage caused by water. This could infer that the electrical system of this vehicle has become faulty and that the electrical system may be more susceptible to failure in a future occurrence including, for example, an accident. This, at least in part, is because many components of the vehicle depend upon the electrical system to work properly. Additionally, there is an increased chance that future repair costs will not only occur, but be more expensive. Accordingly, some entities, such as insurance providers may thus be interested in receiving information to identify vehicles registered in known flood areas or identifying vehicles in declared federal disaster areas to further make a decision regarding insurability.

"Gray Market Vehicle" insurability data variable 28 indicates that the particular vehicle was originally manufactured to the standards of a country other than the U.S.

"Hail" insurability data variable 28 indicates that the particular vehicle has incurred body damage caused by hail.

"Junk" insurability data variable 28 indicates that the particular vehicle is no longer suitable for use on public roads.

"Lease" insurability data variable 28 indicates that the particular vehicle was registered as a lease vehicle. Applicants have found that because leased vehicles generally contain provisions requiring that the leased vehicle must be returned to the dealer in an undamaged condition, the owner is more likely to file an insurance claim for any damages that may occur. Hence, leased vehicles are generally more expensive to insure.

"Last Owner Length of Ownership" insurability data variable 28 indicates the number of elapsed days since the last owner acquisition date. The disclosed invention determines that the longer an owner owns a vehicle, the more inclined the owner is to take care of the vehicle. Thus, insurability is more likely to increase for vehicles having long lengths of ownership for their last owner.

"Number of Owners" insurability data variable 28 indicates that the particular vehicle has had the indicated number of owners. Thus the number of owners indicates all previous or past owners. Applicants have determined that insurability increases for vehicles having less owners, since the value of fewer owners increases the likelihood that the vehicle has been properly serviced and/or maintained.

"Verified Rollback" insurability data variable 28 indicates that the odometer rollback was verified by a law enforcement agency. Insurance carriers use the odometer as a barometer of reliability of the vehicle. If the vehicle odometer is "rolled back", then the data associated with the vehicle generally becomes unreliable. In this regard, insurability of a vehicle can decrease should a determination be made that a verified rollback occurred.

"Police" insurability data variable 28 indicates that the particular vehicle was registered for police use which suggests severe usage. The inferences/conclusions made for this insurability data variable 28 are generally the same as for those listed under "Commercial" insurability data variable 28.

"Personal" insurability data variable 28 indicates that the particular vehicle was registered to a private individual.

"Rental" insurability data variable 28 indicates that the particular vehicle was registered for use in a rental fleet which suggests severe usage. The inferences/conclusions made for this insurability data variable 28 are generally the same as those listed under "Commercial" insurability data variable 28.

"Repossessed Vehicle" insurability data variable 28 indicates that the particular vehicle was reported as being repossessed such as being recovered by a party including, for example, a bank that has ownership rights to the vehicle.

"Safety Inspection Failed" insurability data variable 28 indicates that the particular vehicle failed safety inspection in the last twenty-four calendar months. The inferences/conclusions made for this insurability data variable 28 are generally the same as those listed under "Emissions Test Failed" insurability data variable 28.

"Taxi" insurability data variable 28 indicates that the particular vehicle was registered for use as a taxi. The inferences/conclusions made for this insurability data variable 28 are generally the same as those listed under "Commercial" insurability data variable 28.

"Theft Recovery" insurability data variable 28 indicates that the particular vehicle was stolen, but then was recovered. Inferences derived from this insurability data variable 28 may include evidence which supports that stolen vehicles are typically more abused or driven harder in a manner in which the vehicle was never intended to be driven. (This may include, for example, being used in a robbery such as a "get-away" vehicle.) Accordingly, the integrity of the vehicle may be compromised including various components related to, for example, the brakes, the frame, the steering, and the body. Therefore, even though a stolen vehicle has been recovered, the disclosed invention asserts that insurers may be advised of insuring such vehicles due to the likelihood of subsequent and costly damage in accordance with the present invention.

"Insurance Total Loss" insurability data variable 28 indicates that the particular vehicle was in an accident and that the total value of the vehicle was paid to the insured by the insurance company that insured the vehicle, rather than paying for the repair of the vehicle. Thus, the insurance company took ownership of the particular vehicle due to a total loss payment.

Whereas many of the above noted insurability data variables 28 would generally reduce the insurability of the used vehicle, some of the insurability data variables 28 may increase the insurability of the vehicle as well, depending on the selection of insurability data variables 28 under consideration. For example, the likelihood of insurability of a used vehicle may be increased if the number of previous owners is significantly lower than expected for the age of the vehicle. Of course, the converse may be true in that the likelihood of insurability of a used vehicle may be reduced if the vehicle has a significantly higher number of previous owners than expected for the age of the vehicle.

The insurability data variables 28 may be retrieved, processed, displayed, and/or imported/exported to other databases or forwarded to other entities. For example, the insurability data variables 28 retrieved and processed by the vehicle history report module 35 to create corresponding vehicle history reports for a particular VIN can be displayed by the user interface module 42. Thus, one aspect of the invention includes utilizing at least one insurability data variable 28 for determining insurability of a vehicle. Another aspect of the present invention includes utilizing a predetermined group of insurability data variables 28 for determining insurability of a vehicle as discussed more fully herein below. Moreover, once an insurance policy has been underwritten and rated, the unique set of data variables 28 may also be utilized to determine a premium for a particular vehicle. It should be noted that some insurability data variables 28 can be obtained directly from existing records, such as vehicle title records. However, some insurability data variables must be derived by processing information from existing vehicle records.

As discussed earlier, the preferred embodiment recognizes that certain vehicle history attributes, or insurability data variables 28, correlate to future repair costs of a vehicle. The likelihood and amount of repair costs of a vehicle may impact the insurability of that vehicle. The present invention utilizes a statistical comparison of insurance premiums and insurance claim values for two different values of a particular vehicle attribute as one way of determining whether the vehicle history attribute affects future repair costs and thus insurability, and therefore whether the attribute is an insurability data variable 28.

According to one disclosed embodiment, the aforementioned statistical comparison is defined as a loss ratio. For example, the calculated loss ratio, as determined by an entity such as an insurance company, also influences the selection of certain data variables 28 within a data grouping 34 (as discussed further below). The disclosed embodiment includes evaluating data, such as from insurance companies, to determine a percentage of dollar loss value for the entity before and after a specific event related to a vehicle. For example, in reviewing a series of vehicles in which the airbag was deployed, Applicants determined that the vehicle was more likely to have a subsequent problem related to the airbag in a future unrelated incident such as an accident. This may be because of a failure to properly fix the originally deployed airbag. Thus there may be another malfunction of the airbag such as premature deployment or failure of deployment.

In another example, such as relating to frame damage, the degradation to an original frame of a vehicle may be such that even if it were allegedly fixed from a first accident, the vehicle still may have a tendency to be more susceptible to crumple at the originally damaged location of the frame in a subsequent accident.

Thus, when evaluating the loss ratio, the present invention includes evaluating the ratio of insurance claims to insurance premiums collected. Applicants have determined that the dollar loss value is different for insured vehicles after the occurrence of a specific event (such as an airbag deployment or damage to a frame) than for vehicles in which the aforementioned specific event never occurred. This difference, or loss ratio, can be calculated for a multitude of vehicle history attributes to determine whether a correlation to future repair costs exists.

One example of a loss ratio analysis is as follows:

| Airbag Deployed | # of VINs | % of VINs | Premium $ | Loss $ | Loss Ratio | LR Relativity |
|---|---|---|---|---|---|---|
| No | 194,908 | 99.74% | $231,767,626 | $122,216,470 | 52.73% | 1.00 |
| Yes | 503 | 0.26% | $ 671,372 | $ 486,320 | 72.44% | 1.37 |
| Total | 195,411 | 100.00% | $232,438,998 | | | |

The loss ratio for those vehicles in which the airbag was deployed is significantly greater than the loss ratio for those vehicles without an airbag deployment. Therefore, it may be concluded that the fact that certain vehicles have past airbag deployment increases the likelihood and/or amount of future insurance claims/repair costs for these same vehicles. Consequently, the value of the airbag attribute for any particular vehicle is an important factor in determining insurability and therefore is classified as an insurability data variable 28.

The following table is provided as another example for a loss ratio analysis:

| Frame Damage | # of VINs | % of VINs | Premium $ | Loss $ | Loss Ratio | LR Relativity |
|---|---|---|---|---|---|---|
| No | 194,482 | 99.52% | $231,239,975 | $121,593,633 | 52.58% | 1.00 |
| Yes | 929 | 0.48% | $ 1,199,023 | $ 1,109,157 | 92.51% | 1.76 |
| Total | 195,411 | 100.00% | $232,438,998 | | | |

The loss ratio for those vehicles in which frame damage occurred is significantly greater than the loss ratio for those vehicles without frame damage. Therefore, it may be concluded that the fact that certain vehicles have past frame damage increases the likelihood and/or amount of future insurance claims/repair costs for these same vehicles. Consequently, the value of the frame damage attribute for any particular vehicle is an important factor in determining insurability and therefore is classified as an insurability data variable 28.

Another aspect of the preferred embodiment involves the grouping together of similar insurability data variables 28 that are, for example, similar in type, and/or similar in loss ratio values. By way of example, certain insurability data variables 28 from database 30 have been selected and categorized or grouped into the data groupings 34 shown in FIGS. 4-9. Thus, in one disclosed embodiment, selected insurability data variables 28 having similar loss ratios are placed within certain data groupings 34. The selection or grouping based on loss ratios may also take into consideration the type of insurability data variables 28 as outlined above. For example, all variables having a significant damage event may be grouped together to form a Severe Problem File 68. Also, all variables relating to mileage may be grouped together to form an Annual Mileage File 76.

Upon comparison of similar types of insurability data variables 28 and loss ratios, for example, as outlined above, the disclosed embodiment comprises at least six data groupings 34 for determining insurability as disclosed herein. As shown, for example, in FIGS. 4-9, the data groupings 34 are classified as a Severe Problem File 68, a Potential Damage File 70, an Ownership History File 72, an Ownership Type File 74, an Annual Mileage File 76, and a Potential Fraud File 78. The aforementioned data groupings 34 are provided as one exemplary embodiment and should not be understood to limit the invention. Thus, additional data groupings 34 comprising respective insurability data variables 28, in accordance with aspects of the present invention, may also be created. These data groupings 34 may be utilized in accordance with disclosed embodiments, for example, to facilitate a determination of insurability as disclosed herein.

In the preferred embodiment shown, a vehicle history data analysis unit 26 includes appropriate hardware and software for implementing the vehicle history report module 35, the data determination module 36, and the user interface module 42, each module performing the functions as described in detail below. In this regard, vehicle history data analysis unit 26 may be implemented as a general purpose computing device with a central processing unit (CPU) or processor. The software for operating the vehicle history data analysis unit 26 and the various modules may reside in a computer readable storage medium in the form of executable instructions that operate the vehicle history information system 12 and perform the functionalities and process steps described.

In particular, the vehicle history report module 35 functions to access vehicle history database 30 to retrieve appropriate vehicle history records associated, for example, with a particular VIN that is requested by a user of the vehicle history information system 12. Thus, the vehicle history module 35 includes the appropriate software necessary to identify the appropriate vehicle history dataset from the vehicle history database 30, and to retrieve vehicle history data based on a particular request, for example, a query limited to a particular VIN or plural VINs. The vehicle history report module 35 may further be adapted to arrange and organize the vehicle history data and information in a manner appropriate for further data processing and/or display as a vehicle history report via the user interface module 42 described below.

User interface module 42 is adapted to generate a user interface or output for delivery to output device 24 of customer terminal 14. In particular, the user interface module 42 may be adapted to generate particular electronically displayable files for delivery to, and display by, output device 24 of customer terminal 14. For example, the user interface module 42 may utilize the information provided by the vehicle history report module 35 described in further detail below to generate an output which is provided to the output device 24 of terminal 14. Communications managing module 33 is adapted to manage communications and interactions between vehicle history information system 12 and its various components, as well as with the various terminals 14 via the distributed network 16.

The vehicle data determination module 36 of the vehicle history data analysis unit 26 is adapted to provide a value of one or more insurability data variables 28 as listed, for example, in FIGS. 4-9. The values for each insurability data variable 28 are preferably indicators that the particular vehicle possesses or does not possess the characteristic of the particular insurability data variable 28. For example, if the vehicle history information indicates that the vehicle has or is likely to have a particular insurability data variable 28, such as frame damage, then the value for the "frame damage" insurability data variable 28 is a positive indication, for example, a "yes." On the other hand, if the insurability data variable 28 does not indicate that the vehicle has or is likely to have a particular insurability data variable 28, such as having no frame damage, then the value for the "frame damage" insurability data variable 28 is a negative indication, for example, a "no." Thus, for a particular insurability data variable 28, a value of the aforementioned data variable 28 is affirmed (e.g., via a "yes" indication) or denied (e.g., via a "no" indication"), and underwriting and/or rating may be based on the affirmation or denial of the value of the insurability data variable 28.

In other instances, the resulting information provided by evaluating a data variable 28 may not necessarily provide an indicator such as a positive or negative indicator, for example "yes" or "no," respectively. For example, the "Ownership History File" 72 of FIG. 6 includes two insurability data variables 28, "Number of Owners" and "Last Owner Length of Ownership", which will provide a numerical indicator upon an evaluation thereof. In this example, the aforementioned data variables 28 are associated with a number which may be evaluated and/or analyzed against a predetermined requirement. For example, the question may be whether the numerical indicator of the data variable 28 exceeds a threshold value or falls within a particular numerical range.

In keeping with the above detailed description of "Number of Owners", Applicants have determined that insurability increases for vehicles having less owners, since the value of fewer owners is more likely to reflect a vehicle that has been properly serviced and/or maintained. Also, in accordance with the above description of "Last Owner Length of Ownership", the disclosed invention determines that the longer an owner owns a vehicle, the more inclined the owner is to take good care of the vehicle. Thus, insurability is more likely to increase for vehicles having long lengths of ownership for their last owner. In the current examples, "Number of Owners" may equal five, and "Last Owner Length of Ownership" may equal four months. According to the invention, the decision to underwrite may be declined if the number of owners is more than two. Also, the decision to underwrite may be declined if the last owner length of ownership is less than twelve months. In addition, for example, the rating of an insurance policy may reflect a higher risk and a higher premium if the number of owners is more than two or if the last owner length of ownership is less than twelve months.

For certain data groupings 34, the vehicle data determination module 36 of the vehicle history data analysis unit 26 may be adapted to provide an overall value of an entire data groupings 34. That is, if any one insurability data variable 28 of a particular data grouping 34 has a positive indication, for example, a "yes," then the overall value of the data grouping 34 is also positive or "yes." For example, in reviewing the "Severe Problem File" 68 of FIG. 4, the "Severe Problem Flag" indicates that for any type of title brand, severe accident indicator, or stolen vehicle indicator listed in the data grouping 34, an overall value of the data grouping 34 may be established by a positive indication, for example, a "yes,". Thus, in this example, if the overall value is "yes," then the determination is made not to offer an insurance policy to an applicant. Alternatively, if the overall value is "no," then the determination is made to offer an insurance policy to the applicant, to assign the applicant to a particular policy class, and to rate the policy. The overall value may also be used to rate the policy such that, for example, a "no" would still permit a policy to be written but require a rating reflecting higher risk, e.g. a higher premium. In addition, a number of data groupings 34, for example, three or more, may be selected and evaluated as a basis for underwriting and rating an insurance policy. Thus, underwriting and rating may be based on a combination of respective overall values of the data groupings 34. Hence, if the majority or all of the overall values of the data groupings 34 are in the affirmative, e.g., "yes," or negative, e.g., "no," then underwriting and rating are appropriately made based on this result.

Thus, the information, i.e., overall value provided by an analysis of the insurability data groupings 34, can facilitate a determination of insurability as disclosed herein. This, at least, is due to the similarity of the insurability data variables 28 listed in the data grouping 34 in combination with the related loss ratios of the listed insurability data variables 28. The thusly formed data groupings 34, created in accordance with the disclosed invention, can provide information previously unknown in the art for determining insurability, since the data grouping 34 is specifically packaged to provide specific vehicle history information regarding future losses. In a practical sense, underwriting an insurance policy based on an overall value of the one or more data groupings 34 is indicative of the likelihood of incurring future vehicle repair costs.

While the disclosure describes use of the data groupings 34 comprised of insurability data variables 28, it is noted that the insurability data variables 28 have separate utility apart from being grouped into the aforementioned data groupings 34. The value of the insurability data variables 28 can be reviewed, for example, by an insurance company (or other entity), and used as a basis for underwriting and/or rating an insurance policy as described herein. This may include a scenario in which the value of one insurability data variable 28 is evaluated and underwriting and rating occurs based on this value. In another scenario, the values of a plurality of insurability data variables 28, whether similar or not, may be evaluated and underwriting and rating occurs based upon the results, e.g., any one value exists, a majority of the values exist, or a combination of the values exist or do not exist.

Figure 10:
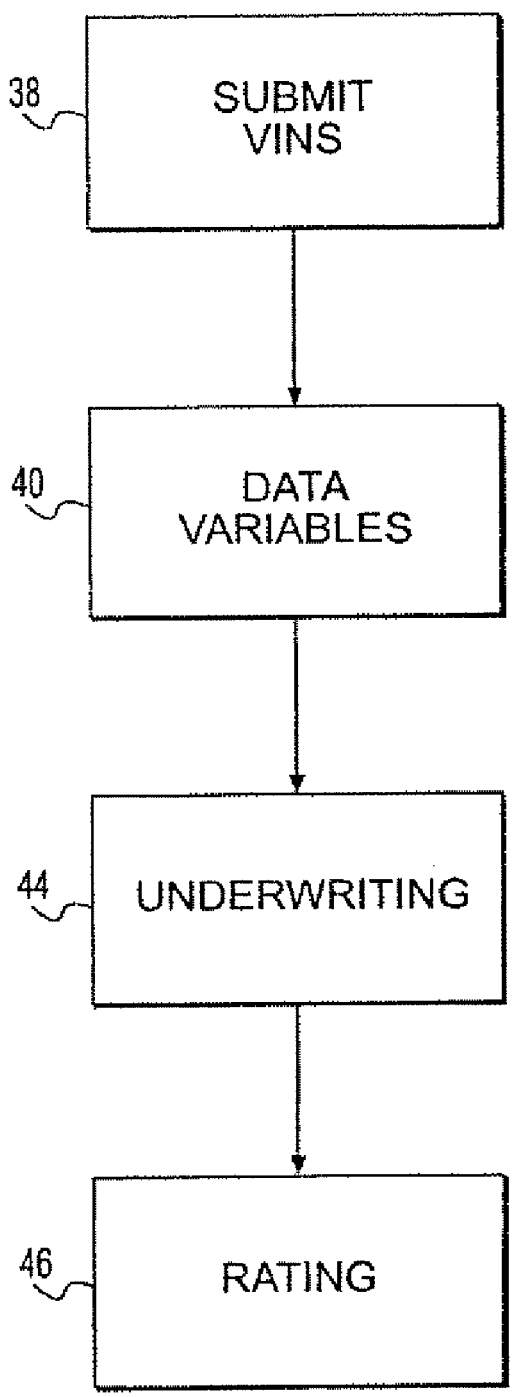
FIG. 10 illustrates a flowchart providing a general overview of an exemplary insurance underwriting and rating process.

Thus, in one example, as shown for instance, in FIG. 10, one or more vehicle identification numbers (VINS) may be submitted (step 38) upon which insurability data variables 28 (step 40) are respectively associated with the one or more submitted VINS. Each insurability data variable 28 will indicate a value of the vehicle based on whether that particular vehicle possesses or does not possess the characteristic of the particular insurability data variable 28. The insurability data variables 28 may further be combined into preselected data groupings 34 as previously discussed. Based upon a value of the respective insurability data variables 28 or the overall value of the respective data groupings 34, underwriting of insurance policy (step 44) occurs based on the values of the insurability data variables 28 or the overall values of the one or more data groupings 34. Furthermore, if an insurance company decides to offer an insurance policy to the applicant, the policy may be rated (step 46) based upon information associated with the insurability data variables 28, such as the value of one or more variables, the overall value of one or more groups of variables, or a value or a score based on one or more data variables as discussed herein below. In another embodiment, the information associated with the insurability data variables 28 may be used only for rating.

Figure 11:
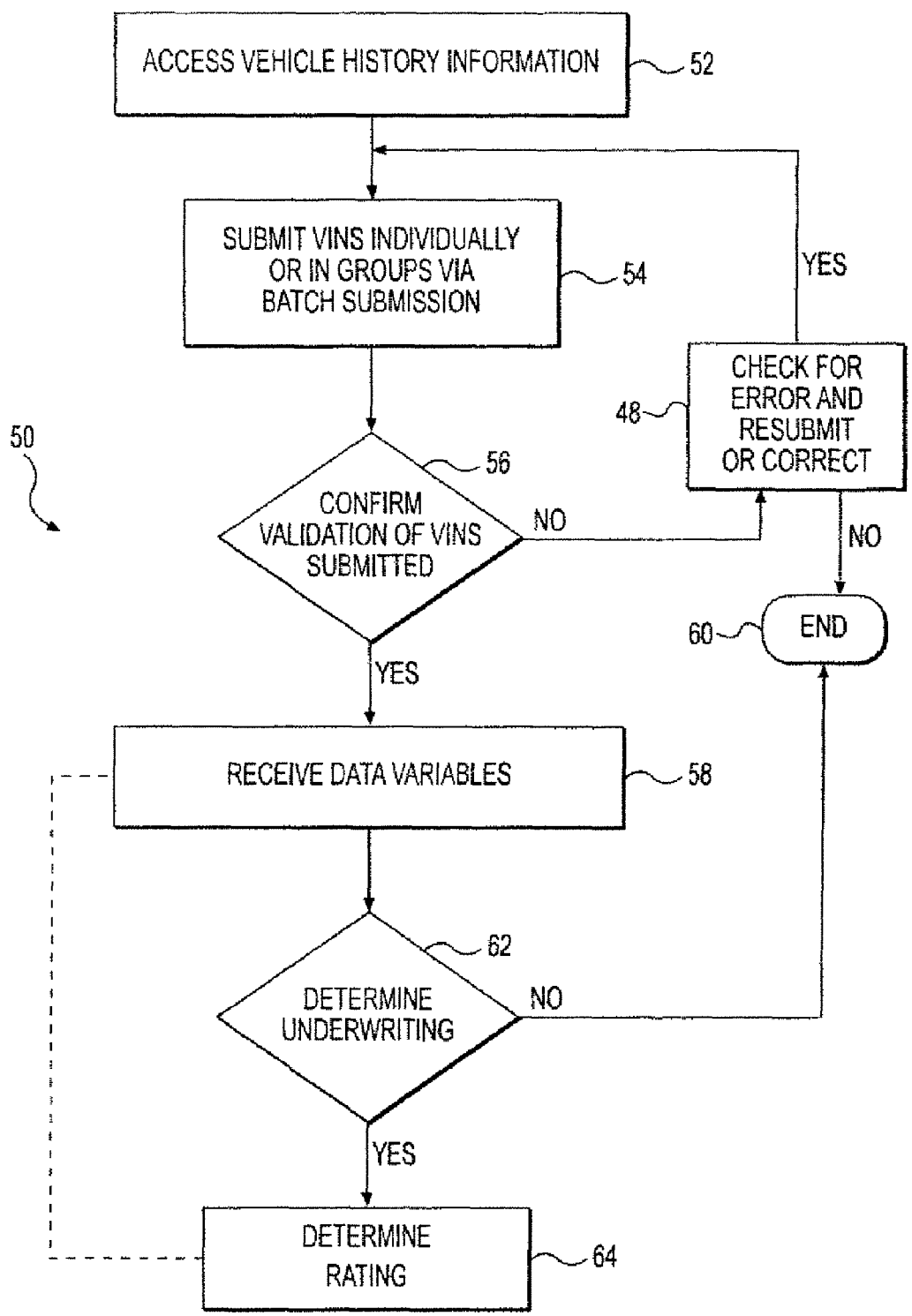
FIG. 11 illustrates a flowchart of an exemplary insurance underwriting and rating transaction according to one disclosed embodiment.

Turning to FIG. 11, an example of an insurance evaluation and rating transaction 50 according to one disclosed embodiment is illustrated. An insurance company may be granted access to the vehicle history information (step 52) provided, for example, by a vehicle history database supplier. In one embodiment, the vehicle history database supplier maintains the vehicle history information system 12 (FIGS. 1 and 2) and is capable of providing data variables 28, and/or grouping data variables 28 to create data groupings 34, according to preferences of the insurance company. The insurance company determines and requests which data groupings 34 will be provided from the vehicle history database supplier for an agreed transaction price. In one example, the aforementioned transaction price may be based upon a number of VIN numbers submitted to the vehicle history database supplier by the insurance company.

Thus, the insurance company submits the VINS (step 54), for example, individually or in a batch submission, to the vehicle history database supplier. The vehicle history database supplier may have an established distributed network 16 (FIGS. 1 and 2) in place to receive and forward the VINS submitted by the insurance company to the vehicle history information system 12 (FIGS. 1 and 2). Alternatively, vehicle history database supplier may allow the insurance company to submit the VINS directly to the vehicle history information system 12.

The VINS are validated (step 56) and the process continues. In one embodiment, the validation process may include receiving information to confirm the vehicle of interest. For example, FIG. 3 depicts a "Demographic File" 66 which provides an exemplary array of information or vehicle identification data 29. The Demographic File 66 may be helpful in confirming that the requested information for the submitted one or more VINS is indeed attributed to the correct one or more vehicles. Thus, the description 37 of each vehicle identification data 29 may further facilitate confirmation of one or more preferred vehicles. In an instance wherein the VINS are not confirmed, the VINS may be checked for accuracy and resubmitted for processing (step 48). Alternatively, the process may end (step 60).

Upon confirmation of the VINS (step 56), insurability data variables 28 are collected from a larger set of vehicle attributes in vehicle database 30 associated with each vehicle and forwarded to the insurance company (step 58). In the present example, the insurability data variables 28 are gathered into the data groupings 34. Upon receiving the data variables 28 and data groupings 34, the insurance company proceeds with the underwriting process including determining whether to offer an insurance policy based on the received information (step 62). In some instances, the insurance company may deny insurance policy requests (step 60), for example, when any one, or certain combination of data variables has a positive value, or any one, or any combination of data groupings has a positive value. In other cases, the insurance company may grant, i.e. decide to write, an insurance policy, for example, when no values, or overall values are positive. In addition, the insurance company may rate the granted insurance policy based on the received data variable 28 and data grouping 34 information (step 64).

In a particular embodiment, an analysis of insurability data variables 28 selected, for example, from the vehicle history database 30 may be performed in which the insurability data variables 28 are utilized to generate a scoring result, i.e., a score. Thus, the score may be used to underwrite an insurance policy. Importantly, the score may also facilitate rating an insurance policy to determine an insurance price or premium. The score may include a numerical value, for example, indicative of a value for an insurance price or premium for a potential customer. That is, the score may be used to generate an overall insurance score attributed to an assessment of risk for a prospective insurance consumer. The underwriting and scoring decisions may be based on the same criteria or rules or may be based on separate criteria or rules.

Thus, in one example, the insurance company supplies one or more VINS to the vehicle history database supplier. Insurability data variables 28 are generated, for example, in accordance with a predetermined agreement. One or more of the insurability data variables 28 may be fed into an algorithm for generating an output. The output may be characterized as a score, which may include a numerical value, mark, symbol, color, and/or any other suitable representation for generating an output. Hence, in one embodiment, the score may include a single numerical value indicative of a result of the data variables 28 being fed within and processed by the algorithm. Furthermore, each of the respective data variables 28 fed to the algorithm may be suitably weighted according to a user preference. Thus, in one embodiment, certain insurability data variables 28 may be weighted more than others, because a user may be interested in particular trends or characteristics of some data variables 28 more than others. For example, an entity such as an insurance company or user, may prefer that certain insurability data variables 28 have a greater impact on insurability than other insurability data variables 28. Therefore, in this embodiment, underwriting, that is, determining whether to offer an insurance policy and assigning the policy to a particular policy class based upon the risk presented by the variables, and rating the policy, is not based on any one value or any one overall value but a weighted combination, i.e., algorithmic or mathematical model or equation.

The algorithm may be executed by a software program appropriately configured to run the algorithm and produce the output described hereinabove. The algorithm may be adaptable for receiving inputted data such as the insurability data variables 28. Thus, in one embodiment, data, such as insurability data variables 28, may be inputted via the software program into the algorithm whereupon the software program executes the algorithm to produce an output such as the disclosed score. In operation, an entity, such as the vehicle history database supplier, may provide a service to a client, such as an insurance company. The service may include running the algorithm and providing a score to the insurance company. Alternatively, the algorithm may be run directly by a party desiring an output of the algorithm (e.g., the score as disclosed herein).

Hence, in accordance with one embodiment, an algorithm may be provided as follows:

$$[X]A+[Y]B \ldots +[Z]C = \text{SCORE}$$

wherein X, Y, and Z are weight factors and A, B, and C are data variables 28 selected from the vehicle history database 30. Thus, in one exemplary application, the following formula based on the disclosed algorithm model is provided as:

$$(A*125)+(B*50)+(C*20) = \text{SCORE}$$

where A is the value of the title brand data variable, B is the value of the frame damage data variable, and C is the value of the severe accident data variable; and wherein, If a title brand exists, then A=1
If no title brand exists, then A=0
If a frame damage record exists, then B=1
If no frame damage record exists, then B=0
If a severe accident record exists, then C=1
If no severe accident record exists, then C=0

In this example, the value of insurability data variable A, directed to title brand, is weighted more heavily than the value of insurability data variables B and C, directed to frame damage and severe accident, respectively. Likewise, the value of insurability data variable B is weighted more heavily than the value of insurability data variable C. The higher weighted insurability data variable is, therefore, given a higher impact on insurability than a lower weighted insurability data variable. Of course, in an embodiment using data groupings 34, A, B, and C (in the above example) may represent overall values of data groupings 34.

In the previous example, the score is represented as a numerical value. Thus, underwriting of a prospective insurance policy may rely on whether the score falls into a numerical range. For example, if the available scoring range is from 0-100, then it may be determined that scores from 70-100 are acceptable and an insurance policy should be offered and thus a score below 70 will indicate that no policy should be offered to the applicant. Importantly, furthermore, the same numerical result of the score may be utilized to determine rating of the insurance policy in order to set a price or premium. For example, if the score falls in a range of 70-80, then the price or premium is set at a first dollar amount. Similarly, if the score falls in a range of 80-90, then the price or premium is set at a second dollar amount different than the first dollar amount. Likewise, if the score falls in a range of 90-100, then the price or premium is set at a third dollar amount different than the first and second dollar amounts. Alternatively, the rating procedure can be based on a separate algorithm or rule and/or a separate score, with respect to the underwriting procedures.

As discussed above, the output, i.e., score, of the algorithm may be useful in a variety of applications for underwriting and rating an insurance policy. For example, if the score is represented as a color, such as green, or a mark such as "+", or a word such as "go", then the indication of green, or "+", or "go" means that it is advisable to offer and assign the respective insurance policy. Alternatively, if the score is represented as a color, such as red, or a mark such as "+", or a word such as "stop", then the indication of red, or "−", or "stop" means that it is not advisable to offer the respective insurance policy.

Also, the score may be used by to determine an insurance price or premium. For example, having calculated a score in accordance with the algorithm above, wherein the score is a numerical value, a calculated insurance premium (IP) may be determined as follows:

$$IP = P * \text{SCORE}/100$$

wherein P is a computed insurance price or premium based upon non-vehicle history data variables. The variable "P" may be based upon criteria utilized in typical calculations for determining an insurance price or premium, such as the driving record or history of the particular person/driver listed on the policy. Thus, the value "IP", according to the disclosed embodiment, provides a modified or "new" price value which otherwise generates an updated insurance price or premium based upon the disclosed score.

Hence, a practical embodiment of the use of the algorithm incorporating insurability data variables 28 has been shown. It has been further shown that the insurability data variables 28 may also be manipulated, such as being weighted against one or more insurability data variables 28 within the algorithm, in order to affect insurability as deemed appropriate.

Thus the embodiment not only provides a method and system for underwriting and rating an insurance policy, but also a method and system for generating information, i.e. overall value of one or more groups of variables, values of individual data variables, a score, etc, useful in underwriting and rating insurance policies. That is, the insurance company may receive the value of one or more variables, the overall value of one or more groups and/or a score or value, and then use that data to underwrite and/or rate by further processing the data, such as described herein.

Any algorithm or rule can be applied to vehicle history data variables, individually or as a group, to determine values to be used for underwriting and/or rating. The values can be expressed as scores, binary values, numeric or non numeric variables, or the like. The invention can be used for underwriting, rating, or both processes. Underwriting and rating can be accomplished as shown in FIG. 10, separately, or in parallel.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A method of determining insurability of a vehicle comprising: identifying a vehicle;
   forming, in a physical memory of a data processing system, a plurality of data groupings using a processing device of the data processing system, wherein each of the plurality of data groupings includes at least one vehicle history data variable of the identified vehicle;
   processing the at least one vehicle history data variable of at least one data grouping of the plurality of data groupings using the processing device of the data processing system;
   determining an overall value of said at least one data grouping using the processing device of the data processing system; and
   calculating an insurability of the identified vehicle, using the processing device of the data processing system, wherein calculating the insurability of the identified vehicle comprises underwriting an insurance policy for the identified vehicle based on said overall value of the at least one data grouping.

2. The method of claim 1, wherein said calculating step comprises rating the insurance policy for the identified vehicle based on said overall value of said at least one data grouping.

3. The method of claim 1, further comprising generating a score based upon an overall value of each of the plurality of data groupings and calculating the insurability of the identified vehicle based on the score.

4. The method of claim 3, wherein said score is calculated based on a weighted combination of the overall values of each of said plurality of data groupings.

5. The method of claim 4, wherein said score is a sum of the weighted overall values of each of said plurality of data groupings represented as a mathematical equation.

6. The method of claim 3, wherein the score is characterized as at least one of one of a number, mark, symbol, and color.

7. The method of claim 1, wherein the step of determining an overall value is based on whether a vehicle possesses or does not possess a characteristic of at least some of said at least one vehicle history data variable.

8. The method of claim 1, wherein the at least one vehicle history data variable formed within the at least one data grouping comprises a plurality of similar vehicle history data variables.

9. The method of claim 8, wherein the similarity of the plurality of vehicle history data variables within the at least one data grouping includes being similar in at least one of type and loss ratio value.

10. The method of claim 1, wherein the at least one data grouping includes at least one of: a Severe Problem data grouping; a Potential Damage data grouping; an Ownership History data grouping; an Ownership Type data grouping; an Annual Mileage data grouping; and a Potential Fraud data grouping.

11. The method of claim 1, wherein the overall value is indicative of the likelihood of incurring future vehicle repair costs.

12. The method of claim 1, wherein the at least one vehicle history data variable includes at least one of: Air Bag Deployed; Abandoned; Canadian Total Loss; Commercial Vehicle; Corporate Fleet Crash Test Vehicle; Curbstoning Advisory; Damage Disclosure; Dismantled; Duplicate Title Issued; Emissions Test; Estimated Current Mileage; Exceeds Mechanical Limits; Exported Vehicle; Flood Advisory; Flood Damaged; Fire; Fire Damage; Frame Inspection; Grey Market Vehicle; Gross Polluter; Hail Damaged; Inconsistent Odometer Reading; Imported Vehicle; Junk; Last Owner—First Odometer Reading; Last Owner—First Odometer Reading Date; Last Owner—Last Odometer Reading; Last Owner—Last Odometer Reading Date; Last Owner—Average Annual Mileage; Last Owner—Recent Annual Mileage; Last Owner—Last 12 Months Average Annual Mileage; Last Owner—Last 24 Months Average Annual Mileage; Last Owner—Last 36 Months Average Annual Mileage; Last Owner Length of Ownership; Last Owner Lien Reported; Lease Vehicle; Manufacturer Buyback (Lemon);
   Not Actual Mileage; Number of Owners; Number of Owners Footnote; Odometer Problem Flag; Odometer Rollover; Personal; Police Accident Report; Police Accident Report—Severe Damage; Police Vehicle; Potential Damage Flag; Potential Odometer Problem; Rebuilt Title Brand; Reconstructed Title Brand; Recycle Vehicle; Rental Vehicle; Reported as Stolen; Repossessed; Safety Inspection Failed; Salvaged Auction; Severe Accident Flag; Stolen Vehicle Flag; Reported Stolen; Theft Recovery; Insurance Total Loss; Taxi Vehicle; Verified Odometer Rollback; and VIN Cloning Advisory.

13. The method of claim 1, wherein said forming step comprises deriving the at least one vehicle history data variable for at least one of: Number of Owners; Duplicate Title Issued; Estimated Current Mileage; Flood Advisory; Gray Market Vehicle Last Owner—Annual Mileage; Last Owner—Recent Annual Mileage; Last Owner—Length of Ownership; Potential Damage Flag; Severe Accident Flag; and Insurance Total Loss.

14. A non-transitory computer readable media comprising code to perform the steps of the method of claim 1.

15. An apparatus for determining insurability of a vehicle comprising:
  means for identifying a vehicle;
  means for forming a plurality of data groupings, wherein each of the plurality of data groupings includes at least one vehicle history data variable of the identified vehicle;
  means for processing the at least one vehicle history data variable of the at least one data grouping of the plurality of data groupings;
  means for determining an overall value of said at least one data grouping; and
  means for calculating an insurability of the identified vehicle, wherein means for calculating the insurability of the identified vehicle comprises means for underwriting an insurance policy of the identified vehicle based on said overall value of the at least one data grouping.

16. The apparatus of claim 15, wherein said means for calculating comprises means for rating the insurance policy for the identified vehicle based on said overall value of said at least one data grouping.

17. The apparatus of claim 15, further comprising means for generating a score based upon an overall value of each of the plurality of data groupings and calculating the insurability of the identified vehicle based on the score.

18. The apparatus of claim 17, wherein said score is calculated based on a weighted combination of the overall values of each of said plurality of data groupings.

19. The apparatus of claim 18, wherein said score is a sum of the weighted overall values of each of said plurality of data groupings represented as a mathematical equation.

20. The apparatus of claim 17, wherein the score is characterized as at least one of one of a number, mark, symbol, and color.

21. The apparatus of claim 15, wherein the means for determining an overall value comprises means for determining the overall value based on whether a vehicle possesses or does not possess a characteristic of at least some of said at least one vehicle history data variable.

22. The apparatus of claim 15, wherein the at least one vehicle history data variable formed within the at least one data grouping comprises a plurality of similar vehicle history data variables.

23. The apparatus of claim 22, wherein the similarity of the plurality of vehicle history data variables within the at least one data grouping includes being similar in at least one of type and loss ratio value.

24. The apparatus of claim 15, wherein the at least one data grouping includes at least one of: a Severe Problem data grouping; a Potential Damage data grouping; an Ownership History data grouping; an Ownership Type data grouping; an Annual Mileage data grouping; and a Potential Fraud data grouping.

25. The apparatus of claim 15, wherein the overall value is indicative of the likelihood of incurring future vehicle repair costs.

26. The apparatus of claim 15, wherein the at least one vehicle history data-variable includes at least one of: Air Bag Deployed; Abandoned; Canadian Total Loss; Commercial Vehicle; Corporate Fleet Crash Test Vehicle; Curbstoning Advisory; Damage Disclosure; Dismantled; Duplicate Title Issued; Emissions Test; Estimated Current Mileage; Exceeds Mechanical Limits; Exported Vehicle; Flood Advisory; Flood Damaged; Fire; Fire Damage; Frame Inspection; Grey Market Vehicle; Gross Polluter; Hail Damaged; Inconsistent Odometer Reading; Imported Vehicle; Junk; Last Owner—First Odometer Reading; Last Owner—First Odometer Reading Date; Last Owner—Last Odometer Reading; Last Owner—Last Odometer Reading Date; Last Owner—Average Annual Mileage; Last Owner—Recent Annual Mileage; Last Owner—Last 12 Months Average Annual Mileage; Last Owner—Last 24 Months Average Annual Mileage; Last Owner—Last 36 Months Average Annual Mileage; Last Owner Length of Ownership; Last Owner Lien Reported; Lease Vehicle; Manufacturer Buyback (Lemon); Not Actual Mileage; Number of Owners; Number of Owners Footnote; Odometer Problem Flag; Odometer Rollover; Personal; Police Accident Report; Police Accident Report—Severe Damage; Police Vehicle; Potential Damage Flag; Potential Odometer Problem; Rebuilt Title Brand; Reconstructed Title Brand; Recycle Vehicle; Rental Vehicle; Reported as Stolen; Repossessed; Safety Inspection Failed; Salvaged Auction; Severe Accident Flag; Stolen Vehicle Flag; Reported Stolen; Theft Recovery; Insurance Total Loss; Taxi Vehicle; Verified Odometer Rollback; and VIN Cloning Advisory.

27. The apparatus of claim 15, wherein said means for forming comprises means for deriving the at least one vehicle history data variable for at least one of: Number of Owners; Duplicate Title Issued; Estimated Current Mileage; Flood Advisory; Gray Market Vehicle Last Owner—Annual Mileage; Last Owner—Recent Annual Mileage; Last Owner—Length of Ownership; Potential Damage Flag; Severe Accident Flag; and Insurance Total Loss.

* * * * *